United States Patent Office 3,425,976
Patented Feb. 4, 1969

3,425,976
ANTI-FOGGING FILM COMPRISING VINYL CHLORIDE POLYMER, GLYCEROL MONOSTEARATE AND INCOMPATIBLE PLASTICIZER
George Mellen Adams, Palos Heights, and Donatas Tijunelis, Chicago, Ill., assignors to Union Carbide Corporation, a corporation of New York
No Drawing. Filed Aug. 18, 1965, Ser. No. 480,771
U.S. Cl. 260—23                                14 Claims
Int. Cl. C08f 3/30, 45/00

ABSTRACT OF THE DISCLOSURE

An anti-fog vinyl chloride polymeric film is obtained by incorporating in a plasticized vinyl chloride polymer a monoglyceride of fat-forming fatty acids or mixtures of monoglycerides and diglycerides of fat-forming fatty acids in an amount sufficient to impart anti-fogging characteristics to the film. The plasticizer system employed consists of at least about 25 parts of a plasticizer which is incompatible with the anti-fog additive. Where the plasticizer system consists of at least one incompatible and one compatible plasticizer, the ratio of incompatible to compatible plasticizer should be at least 2.5 to 1.

This invention relates to the prevention of fogging of packaging film surfaces by condensed moisture and particularly to the prevention of moisture fogging of self-supporting, plasticized, vinyl films employed in the packaging of moisture containing food products.

Self-supporting plasticized, vinyl films made from vinyl chloride homopolymers or copolymers of vinyl chloride and vinyl acetate are characterized by high resistance to the passage of moisture. This property makes them of value for packaging moisture containing food products by preventing the loss of moisture with a resulting loss of quality. Another valuable feature of vinyl films is their high transparency enabling ready identification and observation of the contents of the package.

The ability of plasticized vinyl films to retain moisture is readily apparent when moisture containing products such as frankfurters, hams, smoked butts and similar materials are packaged in them. Sufficient moisture evaporates and accumulates in the spaces inside the package to saturate the air. When the package is stored in a refrigerated display case, the moisture condenses on the inside surface of the vinyl film in the form of small droplets. These droplets cause an overall fogged effect thereby interfering with the visual identification of the product encased therein.

It has now been found that the incorporation of specific amounts of an anti-fog agent including monoglycerides of fat-forming fatty acids or mixtures of monoglycerides and diglycerides of fat-forming fatty acids wherein the active ingredient is the monoglycerides in a plasticized vinyl film is unexpectedly effective in causing moisture condensing on the surfaces of a film formed from such composition to coalesce into a continuous visually clear film instead of forming a fogged surface comprising individual droplets of water.

In accordance with the present invention an anti-fogging flexible, vinyl chloride polymeric film is provided which comprises, plasticized vinyl chloride polymer and glycerol monostearate. The glycerol monostearate is present in sufficient quantity to impart anti-fogging characteristics to the film and, advantageously, in an amount from 0.1 to 1 part. The plasticizer system consists of at least 25 parts of a plasticizer incompatible with the glycerol monostearate and a compatible plasticizer, the ratio of incompatible to compatible plasticizer being at least 2.5 to 1.

The objects of the invention will become readily apparent and the invention will be more fully understood from the following description of the invention, wherein quantities are parts per hundred parts resin (phr.) unless otherwise stated. The terms glycerol monostearate and glycerol monostearate are used interchangeably.

The monoglycerides of the present invention are generally commercially available as mixtures of monoglycerides and diglycerides. Such mixtures are effective as anti-fog agents wherein up to about 55% of the mixture is diglycerides. On the other hand, a commercial mixture containing predominantly diglycerides is not effective as an anti-fog agent in plasticized vinyl films.

The term "fat-forming fatty acids" as used herein is definitive of those fatty acids present as such or as glycerides in natural fats. The Yearbook of Agriculture, 1959 Food U.S. Department of Agriculture, page 716, defines fat as follows:

"A glyceryl ester of fatty acids. Fats generally are substances of plant and animal origin. Fat may be in solid form, as butter, margarine or other shortenings, or in liquid form, as the vegetable oils."

The monoglycerides and mixtures of monoglycerides and diglycerides useful in the practice of this invention can be prepared by known procedures, as for example, by the glycerolysis of natural fats or oils, these being essentially mixtures of various fatty acid triglycerides. Upon glycerolysis of such oils or fats, there is usually obtained a complex mixture of alpha and beta monoglycerides, diglycerides and traces of triglycerides and free fatty acids. The components of such mixtures can be separated by suitable distillation processes.

Illustrative examples of monoglycerides and mixtures of monoglycerides and diglycerides effective for the purposes of this invention are those obtained by the glycerolysis of such fats or oils as beef tallow, mutton tallow, butter fat, coconut oil, corn oil, cottonseed oil, lard oil, olive oil, peanut oil, soy bean oil, sesame oil and from their partially or fully hydrogenated derivatives.

In general, the commerically available monoglycerides or mixtures of monoglycerides and diglycerides of fat-forming fatty acids contain traces of preservatives such as $\frac{1}{100}$ of 1 percent by weight of butylated hydroxy anisole, $\frac{1}{100}$ of 1 percent by weight of butylated hydroxy toluene and $\frac{1}{100}$ of 1 percent by weight of citric acid in a propylene glycol carrier. Commercially available products generally will also contain small amounts of free glycerine, generally less than 1.5 percent, small amounts of free fatty acids, generally less than 0.5 percent and small amounts of triglycerides of fat-forming fatty acids.

The incorporation of the anti-fog agents comprising monoglycerides or mixtures of monoglycerides and diglycerides of fat-forming fatty acids in plasticized vinyl films to impart thereto resistance to moisture fogging can be effected in several ways.

Advantageously, the anti-fog agent is homogeneously incorporated into the plasticized vinyl film. This may be readily accomplished with finely powdered anti-fog agents by adding them to the powdered vinyl resin during the dry blending operation. If a solid chunk form of anti-fog agents is to be used, it may be incorporated by heating it in a portion of the plasticizer used in the plasticized vinyl film to above the melting point of the anti-fog agent and then cooling to room temperature while maintaining continuous agitation. A uniform dispersion of anti-fog agent is obtained which can be readily incorporated into the powdered vinyl resin with the remaining plasticizer or plasticizers during the preparation of the compound to be extruded. It will be obvious to those skilled in the art that other methods of incorporating the anti-fog agent in the film can be used.

The incorporation of an anti-fog agent in plasticized vinyl film is preferred over other methods such as coating the film with the anti-fog agent for several reasons. First, in using a coating an adequate solvent must be found. Moreover, as a matter of economics, the anti-fog agent can simply be incorporated in the plasticized vinyl film by adding it during the blending of the other ingredients to the mixture to be extruded. On the other hand, a coating containing an anti-fog agent must be applied after the plasticized vinyl film is formed, thereby necessitating coating and solvent removal equipment.

In the preferred form of this invention, the plasticized vinyl film is extruded in tubular form and this further complicates the technical problems of forming an interior coating containing the anti-fog agent. Thus overall processing costs are less when the anti-fog agent is incorporated in the plasticized vinyl film. Another reason for preferring the incorporation of the anti-fog agent is that a coating containing an anti-fog agent may be wiped or washed off the plasticized vinyl film surface. Accordingly, the fog resistance of the film is greatly impaired causing a fogged effect in the areas where the coating is removed when the film is used as a packaging material as herein described. In contrast, when the anti-fog agent is incorporated in the plasticized vinyl film, it is generally believed some of the anti-fog agent remains therein and will not migrate to the surface. Thus when the migrated portion of the anti-fog agent is removed from the film surface, that which remains will migrate to the surface. In this manner, the film remains fog-resistant even upon removal of at least the initial portion of the anti-fog agent which has migrated to the film surface.

Film forming vinyl polymers useful in this invention include vinyl chloride homopolymers, copolymers and mixtures thereof. The polyvinyl chloride and polyvinyl chloride-vinyl acetate are typical useful vinyl chloride polymers. The preferred base resin for forming compositions is a polyvinyl chloride homopolymer. In order for the film to possess good toughness properties at low temperature, the vinyl chloride resin employed preferably have a minimum intrinsic viscosity of 0.8 deciliter per gram and desirably in the range of 0.8 to 1.4 deciliters per gram. This requirement represents those vinyl chloride resins which have the highest molecular weight of the presently available commercial vinyl chloride resins.

The vinyl chloride resin, prior to incorporation in the composition is preferably in the form of a powder having a particle size and configuration ranging from finely divided, compact particles having a mean diameter of 1.2 microns to large porous particle size having a mean diameter of 22–32 microns. Also, polyvinyl chloride resins made by the "suspension" process and having particle sizes up to about 200 microns have been used successfully in preparing fog resistant plasticized vinyl chloride films for packaging of moisture containing foods.

The plasticizers used in the compositions described herein must be non-toxic for use in packaging food products. The total content of the plasticizer system should be such as will plasticize the film to the necessary extent for satisfactory operation on packaging equipment. For example, it may be desirable to stretch the film up to 50% at 40° F. to permit insertion of the food product using equipment as described in U.S. Patent 2,884,328 to Johnson. On the other hand, excessive plasticization leads to increasing blocking tendencies and hence, the minimum amount of plasticizer producing the desired results should be used.

While many plasticizers are available which meet the requirements of non-toxicity and ability to plasticize polyvinyl chloride resin, it has been unexpectedly found that not all such plastizers will provide a packaging film having good anti-fog properties when used with the anti-fog agents described herein.

It is believed that the anti-fog improvement depends on plasticizer type and is based on compatibility of the anti-fog agent used with the plasticizers. This conclusion is based on data given in Table I wherein is described the visual appearance of mixtures of glyceryl monostearate with several plasticizers and plasticizer combinations after heating to 150° F. with stirring and then cooling to room temperature. As shown, glyceryl monostearate in combination with epoxidized soy bean oil gives a thick, homogeneous dispersion indicating good compatibility. Lkewise, glyceryl monostearate in combination with di-2-ethyl-hexyl phthalate gives a thick, homogeneous dispersion. As shown in Table II, films based on epoxidized soy bean oil and 2-ethyl hexyl phthalate and containing 0.5 phr. of the glyceride did not have good anti-fog characteristics.

On the other hand, glyceryl monostearate in combination with di-2-ethyl hexyl adipate alone or combined with epoxidized soy bean oil gives thin, heterogeneous mixtures indicating poor compatibility. Likewise, glyceryl monostearate in combination with di-n-butyl sebacate alone or combined with epoxidized soy bean oil gives thin, heterogeneous mixtures indicating incompatibility. For example, a polyvinyl chloride film plasticized with incompatible plasticizers such as di-2-ethyl hexyl adipate and/or di-n-butyl sebacate and containing 0.5 part of glyceryl monostearate per hundred of resin showed good anti-fog properties whereas a similar film containing a compatible plasticizer such as di-2-ethyl hexyl phthalate and 0.5 part of glyceryl monostearate did not have anti-fog properties. The 0.5 part glyceryl monostearate was a commercial mixture containing 55% of the glyceryl monostearate.

TABLE I

| Plasticizers (Before adding Glyceryl Monostearate) | | | Mixtures (Cooled to Rm. Temp. after adding 10% Glyceryl Monostearate) | |
| --- | --- | --- | --- | --- |
| Type | Percent | Zahn #3 Viscosity | Description | Zahn #3 Viscosity |
| Di-2-ethyl hexyl adipate | 100 | 9 | Solid-in-liquid heterogeneous unstable dispersion. | 16 |
| Di-2-ethyl hexyl adipate | 72 | 9 | do | 32 |
| Epoxidized soy bean oil | 28 | | | |
| Di-n-butyl sebacate | 100 | 9 | do | 12 |
| Di-n-butyl sebacate | 72 | 13 | Solid-in-liquid heterogeneous unstable dispersion with some solvation. | 150 |
| Epoxidized soy bean oil | 28 | | | |
| Epoxidized soy bean oil | 100 | 46 | Gel-consistency of soft butter | No flow |
| Di-2-ethyl hexyl phthalate | 100 | 12 | do | No flow |
| Di-2-ethyl hexyl phthalate | 72 | 13 | do | No flow |
| Epoxidized soy bean oil | 28 | | | |

TABLE II

| No. | Glyceride Mixture, Phr.[a] | Plasticizer | | Anti-Fog Rating [b] |
| --- | --- | --- | --- | --- |
| | | Type | Conc., Phr. | |
| 1 | 0.5 | Di-2-ethyl hexyl adipate | 28 | 1.0 |
| | | Epoxidized soy bean oil | 10 | |
| 2 | 0.5 | Di-2-ethyl hexyl adipate | 20 | 3.4 |
| | | Epoxidized soy bean oil | 10 | |
| 3 | 0.5 | Epoxidized soy bean oil | 35 | 4.0 |
| 4 | 0.5 | Di-n-butyl sebacate | 27.5 | 1.0 |
| | | Epoxidized soy bean oil | | |
| 5 | 0.5 | Di-2-ethyl hexyl phthalate | 28 | 3.9 |
| | | Epoxidized soy bean oil | | |

[a] 55% monoglyceride.
[b] Averages of five samples.

The anti-fog agent of the present invention is incorporated in the plasticized polyvinyl chloride film in an amount which imparts fog-resistance to the film and not more than that which does not appear to further improve the anti-fog properties of the film and/or not more than that which adversely affects the other normally desired physical characteristics of the film. It has been found that if an excess amount of anti-fog agent is incorporated in the plasticized polyvinyl chloride film, it tends to have a greasy feel and the optical properties such as haze and transparency are impaired.

Thus to produce about a 0.5–3.0 mil thick fog resistant plasticized polyvinyl chloride film without adversely affecting its other normally desired properties, the anti-fog agent is added in amounts from about 0.05 to 1 part per hundred parts of resin (phr.) and preferably from 0.1 to 0.3 phr. Incorporation of less than .05 phr. of anti-fog agent does not impart any appreciable improvement in the anti-fog properties of films produced from these compositions. Incorporation of more than 1.0 phr. of anti-fog agent does not result in any further improvement of anti-fog properties. Furthermore, the resultant film has a greasy feel and the optical properties are impaired.

In order to determine the effectiveness of anti-fog agents in plasticized polyvinyl chloride films, an empirical laboratory test may be used. Eight ounce glass jars are filled with water at 70–75° F. to one inch from the top. These may be conveniently allowed to equilibrate by standing at ambient conditions over night. The open end of the jars are covered with pieces of the films to be tested and a tight seal is made by means of a rubber band around the jar. The jars so prepared are placed in a cold environment such as a 40° F. refrigerator. Observation is then made of the degree of fog which occurs on the film surface after various time intervals.

A numerical rating is conveniently used to estimate the degree of fog development according to the following system:

THE ANTI-FOG RATING SYSTEM

| Rating | Degree of Transparency | Fog Condition |
| --- | --- | --- |
| 4 | No see-through of color or outline. | Very fine fog having a silvery color of its own. |
| 3 | Translucent to color only. | Fine fog without a color of its own. |
| 2 | Some distorted transparency. | Small droplets (no "full" drops). |
| 1 | Good transparency with only occasional distortion. | "Full" drops and some clear areas. |
| 0 | No interference. | No drops only clear film (wet or dry). |

A number 4 rating would typically be obtained when a conventional film is employed in a two pound frankfurter package if the package is transferred from a 60° F. temperature to a 40° F. environment such as found in a refrigerated display case. The fog will appear within 10 minutes and will remain indefinitely.

On the other hand, a film containing 0.2 part of glyceryl monostearate on a two pound frankfurter package with the frankfurters at 60° F. will fog initially when placed into a 40° F. environment but, within 10–20 minutes, the moisture droplets will begin to coalesce and within 1–2 hours the moisture will be spread into a substantially even, continuous film which no longer interfers with the transparency of the film. The film has a rating approaching 0.

In melt extruding the plasticized polyvinyl chloride composition into film, thermal stability is needed. Most of the non-toxic heat stabilizer or mixtures thereof can be used for this purpose.

Plasticized polyvinyl chloride films tend to be soft and slightly tacky at room temperature. As a result the film surfaces tend to adhere to each other or "block." This tendency may be lessened or overcome by the incorporation in the film composition of small amounts of waxes and infusible fillers.

The proportions of the components constituting this film can vary within limits. Satisfactory results can be obtained when the ingredients and proportions (parts by weight) are as set forth in Table III.

TABLE III

| | High Range | Low Range | Optimum |
| --- | --- | --- | --- |
| Polyvinyl Chloride Resin [1] | 100 | 100 | 100 |
| Plasticizer System [2] | 50 | 25 | 38 |
| Additives [3] | 9.5 | 2 | 5.5 |
| Anti-Fog Agent | 1 | 0.1 | 0.2 |

[1] Vinyl chloride homopolymer having an intrinsic viscosity value of 0.80 deciliter per gram or higher as calculated from reduced viscosity measurement of dilute solutions in nitrobenzene at 30° C. The preferred resin has ASTM oil absorption values between 0.55 and 0.70.
[2] Can be a single plasticizer or mixture of plasticizers. The preferred plasticizers are di-n-butyl sebacate and di-2-ethyl hexyl adipate. An epoxidized fatty acid glyceride such as epoxidized soy bean oil can also be incorporated in the system, at a ratio heretofore described.
[3] Typical additives are: synthetic polyamide wax such as ethylene diamine bis stearamide; calcium ricinoleate; infusible fillers, such as diatomaceous earth; and zinc stearate and the like.

Although several blending devices and compounding techniques are well known in the art for use in preparing film forming compositions, in the preferred method the dry ingredients, excepting the infusible filler, are thoroughly mixed in a double-arm Sigma blade mixer such as the Baker-Perkins W.P. mixer having a jacket through which cooling water or steam may be circulated. The plasticizers are added while mixing continues at ambient temperature. It is desirable to prevent the temperature of the ingredients from rising about 100° F. by circulation of cooling water in the jacket.

The mixing is continued until a uniformly wetted coherent paste is formed. Approximately 10–45 minutes are required for this operation from the time the plasticizers are added. At this point, steam is circulated through the jacket of the mixer, and the mixing is continued until the charge is transformed into a dry powder and a temperature of 200°–210° F. is reached. At this point, the infusible filler is added and after approximately five minutes further mixing, the dry powder is discharged into a granulator to reduce the particle size of any agglomerates. The dry granulated blend is cooled in a suitable slow speed mixer to a temperature of 130° F. or less and then stored or delivered to extrusion machines.

Anti-fog compositions of this invention can be extruded into self-supporting films by any of the methods known in the art. Preferably, however, when seamless tubing is desired the compositions are extruded by the blown-tube method disclosed in U.S. Patent 2,461,975 to Fuller, U.S. Patent 2,461,976 to Schenk, and U.S. Patent 2,876,497 to Alexander. These methods comprise, in general, melt extruding the composition through an annular die in the form of seamless tubing, drawing the tubing from the die, and thereafter cooling, flattening and winding the tubing on reels. A bubble of a gaseous medium is maintained within the tubing between annular die and the flattening means to distend the tubing to the desired diameter.

The resulting fog resistant, plasticized polyvinyl chloride tubing can be printed satisfactorily by usual means and can be heat sealed to form bags of the desired size.

The following examples serve to further illustrate the invention, but are not to be construed in limitation thereof. As employed herein, the term "parts" refers to parts by weight, based upon 100 parts of the vinyl polymer.

EXAMPLES 1–4

Ten parts of a commercially pure mono and di-glyceryl ester of a fatty acid mixture in solid lump form were heated together with 90 parts of an epoxidized soy bean oil to 150° F. with continuous stirring. The mixture was permitted to cool to room temperature with continuous agitation resulting in a smooth homogeneous paste. The commercially pure mono and di-glyceryl ester of a fatty acid mixture had the following description:

Melting point, ° F. _____ 131–135
Acid value, max. _____ 3
Saponification number _____ 165–175
Total monoglyceride content, percent, approx. _ 45

Composition of fatty acids:
    Stearic, percent, approx. _____ 55
    Palmitic, percent, approx. _____ 45

TABLE IV

| Ex. No. | Glyceride Mixture Concentration, Phr. | Film Appearance Rating* | | | |
|---|---|---|---|---|---|
| | | Exposed 3 Minutes | Exposed 10 Minutes | Exposed 1 Hour | Exposed 3 Hours |
| Control | 0.0 | 4.0 | 4.0 | 4.0 | 3.9 |
| 1 | 0.1 | 4.0 | 4.0 | 4.0 | 3.9 |
| 2 | 0.3 | 4.0 | 2.9 | 2.1 | 1.5 |
| 3 | 0.5 | 2.5 | 1.8 | 1.0 | 0.75 |

*Average rating of three samples each.

Further tests were made to determine the effect of the anti-fog additive on the optical qualities and printability of the polyvinyl chloride films as shown in Table V.

TABLE V

| Example Number | Glyceride Mixture Concentration, Phr. | Percent Haze ASTM Method D-1003-52 | | Visible Bleedout | | Printability | |
|---|---|---|---|---|---|---|---|
| | | Fresh | Aged 2 mo. | Fresh | Aged 2 mo. | Fresh | Aged 2 mo. |
| Control | 0.0 | 16.0 | 16.0 | None | None | Good | Good. |
| 3 | 0.5 | 22.0 | 22.0 | do | do | do | Do. |
| 4 | 1.4 | 22.0 | 27.0 | Slight | Heavy | do | Fair. |

The epoxidized soy bean oil had the following description:

Specific gravity at 20/20 C. _____ 0.990
Viscosity at 100° F. _____cps__ 162
Acid number (as acetic acid) _____ 0.007–0.008
Iodine value, max. _____ 3.0
Oxirane oxygen, percent, min. _____ 6.3
Saponification number, approx. _____ 181

Compositions suitable for extruding into plasticized polyvinyl chloride film were prepared containing varying amounts of the described paste to give the concentration of glyceride mixture subsequently indicated. The glyceride containing paste was premixed with the remaining epoxidized soy bean oil in the formulation to promote rapid and simple dispersion in the composition. The compositions prepared included 100 parts of a vinyl chloride homopolymer having an average particle size of 4 to 32 microns, an intrinsic viscosity of at least 0.90 and an oil absorption value of between about 0.55 to 0.70 and were charged into a Baker-Perkins sigma blade mixer. Three parts of calcium ricinoleate and 0.75 part of zinc stearate were premixed at room temperature and added to the mixer while the stock was being mixed. After the mixture was thoroughly blended, 27.5 parts of di-n-butyl sebacate and 10 parts of epoxidized soy bean oil, less the amount of epoxidized soy bean oil included in the glyceride paste, were mixed together with the required amount of glyceride paste and were then added to the Baker-Perkins mixer. A uniformly wetted coherent paste was formed after about 30 minutes mixing time after adding the plasticizers. The temperature of the mixer was not permitted to rise above 100° F. by addition of cooling water in the jacket of the mixer. After a coherent paste was formed, steam was used in the jacket to raise the temperature of the ingredients to 210° F. at which point the coherent paste had been converted into a dry powder.

At this point 0.75 part of synthetic polyamide wax and 0.75 part of diatomaceous earth were added. After an additional five minutes of mixing, the compound was discharged into a granulator to reduce any agglomerates to a size suitable for melt extrusion.

The compound was melt extruded into tubular form having a thickness of 2.0 mils and a flat width of 5½ inches using the blown-tube method described in United States Patent No. 2,876,497. Pieces of the tubing were slit into sheet form and were tested for anti-fog properties. As a control, the same composition used in preparing the anti-fog films, but without anti-fog agent, were extruded by the same method. The results were recorded in Table IV using the test method described herein.

EXAMPLES 5–6

Plasticized polyvinyl chloride films containing a homogeneously dispersed mixture of glycerides as described in Examples 1–4 were used to package frankfurters. The plasticized polyvinyl chloride films containing the indicated amounts of the mixture of mono and di-glycerides of fat-forming fatty acids were made into bags by heat sealing the ends of lengths of tubing. The bags so prepared were stretched using apparatus as described in U.S. Patent 2,884,328. The bags containing two pounds of frankfurters were closed and made air tight by placing metal clips on the open end. The packages so prepared were placed in a refrigerated room maintained at 40° F. and observations were made as to the degree of fog development after various time periods. The results of these tests are given in Table VI.

TABLE VI

| Ex. No. | Glyceride Mixture Concentration, Phr. | Appearance of Packages | |
|---|---|---|---|
| | | Exposed 5 Minutes | Exposed 2 Hours |
| 5 | 0.5 | Fine fog, translucent | Large drops, transparent. |
| 6 | 0.35 | do | Do. |
| Control | 0.0 | Very fine fog, no transparency. | Very fine fog, no transparency. |

Plasticized polyvinyl chloride films were prepared by the method described in Examples 1–4 except that a finely powdered mixture of mono and di-glycerides of fat-forming fatty acids was used as the anti-fog agent. The powdered anti-fog agent was mixed directly with the calcium ricinoleate, zinc stearate and polyvinyl chloride resin rather than melting and dispersing in the epoxidized soy bean oil. The results of tests made with these films were the same as those obtained in Examples 1–6.

EXAMPLE 7

Various glycerides were homogeneously dispersed into film forming plasticized polyvinyl chloride according to the procedures described in Examples 1–4. The resultant compositions were similarly melt-extruded into self-supporting films. The films were examined for their resistance to moisture fogging by the same test method employed in Examples 1–4. The test results are tabulated in the subsequent table.

TABLE VII

| Type of Glyceride | Glyceride Content in Film, Phr. | Film Appearance after 30 Minutes Exposure |
|---|---|---|
| Glyceryl Mono-oleate | *0.56 | Very fine fog, no transparency. |
| Glyceryl Di-stearate | *0.5 | Do. |
| Glyceryl Mono-laurate | *0.5 | Do. |
| Mixture of Mono-glycerides | 0.3 | Large drops of water, good transparency. |

*All commercial mixtures containing about ½ of the indicated fatty acid glyceride.

The mixture of monoglycerides used in Example 7 was a commercial mixture of about 93% by weight glyceryl monostrearate and 7% by weight of glyceryl monopalmitate having the following chemical and physical properties.

| | |
|---|---|
| Monoester content, percent, minimum | 90.0 |
| Spanoification value | 155–165 |
| Iodine value, maximum | 3 |
| Glycerol content, percent, maximum | 1.0 |
| Free fatty acid (as stearic), percent, maximum | 1.5 |
| Specific gravity at 80° C. | 0.92 |
| Congeal point, ° C. | 70 |
| Cloud point, ° C. | 70 |
| Clear point, ° C. | 78 |

EXAMPLE 8

The procedure of Example 3 was repeated using 28 parts di-2-ethyl hexyl adipate as plasticizer in place of 27.5 parts of di-n-butyl sebacate. The resultant composition was melt extruded into a self-supporting tubular film. The film was examined for its resistance to moisture fogging by the same test employed in Examples 1–4. The film had a clear appearance after one hour.

EXAMPLE 9

The procedure of Example 3 was repeated using 20 parts of di-2-ethyl hexyl adipate as plasticizer in place of 27.5 parts of di-n-butyl-sebacate. The resultant composition was melt-extruded into a self supporting tubular film. The film was examined for its resistance to moisture fogging by the same test employed in Examples 1–4. The film did not show appreciable fog elimination after one hour.

EXAMPLE 10

The procedure of Example 3 was repeated using 28 parts of di-2-ethyl hexyl phthalate as plasticizer in place of 27.5 parts of di-n-butyl sebacate. The resultant composition was melt extruded into a self-supporting tubular film. The film was examined for its resistance to moisture fogging by the same test employed in Examples 1–4. The film did not show appreciable fog elimination after one hour.

By way of contrast, a rigid self-supporting film was prepared by mixing 100 parts of a vinyl chloride-vinyl acetate copolymer resin with 6.5 parts of epoxidized soy bean oil, 1.1 parts of heat stabilizer and 0.53 part of the commercial mixture of mono and di-glycerides used in Examples 1–4. The mixing was performed in a high speed blender. The copolymer resin had a composition of 90% vinyl chloride and 10% vinyl acetate and an inherent viscosity of 0.8. The resultant composition was melt extruded into a stiff, self-supporting film. The film was examined for its resistance to moisture fogging by the same test employed in Examples 1–4. The film did not show appreciable fog elimination after one hour.

Since the commercial grades of glycerides contain large quantities of diesters along with the monoesters, an experiment was conducted with a purer grade (90+%) of glycerol monostearate, in order to demonstrate that the monoester was the principal anti-fog ingredient.

Based on the concentration of monoester in a 0.5 part of commercial product, i.e.:

$$\frac{(0.5)(54)}{100} = .27 \text{ part of monoester}$$

an equivalent vinyl film was extruded containing 0.3 part of refined glycerol monostearate which according to the supplier's specification is at least 90% monoester content (therefore, containing at least 0.27 part of monoester).

When compared for fog reducing effectiveness, it was found that the film containing 0.3 part of 90% monoester was at least as fog-resistant as the one containing 0.5 part of the commercial product. Consequently, it was concluded that the monoester fraction is the primary anti-fog ingredient. This was further confirmed by the lack of anti-fog properties in film produced wth a product predominantly glycerol distearate.

Samples of film prepared with 0.5 part of glycerol monolaurate had relatively little anti-fog effect. Therefore, it was further concluded that the higher molecular weight monostearate is more effective.

It is to be understood that other modifications and changes in the embodiments of the invention herein shown and described can be made without departing from the spirit and scope of the invention.

What is claimed is:

1. An anti-fogging, flexible, plasticized, polymeric film obtained from the class consisting of vinyl chloride homopolymer and copolymers, said polymeric film containing glycerol monostearate and a plasticizer system, the glycerol monostearate being present in sufficient quantity to impart anti-fogging characteristics to said polymeric film and at least one component of the plasticizer system being incompatible with the glycerol monostearate.

2. An anti-fogging, flexible, plasticized polymeric film obtained from the class consisting of vinyl chloride homopolymer and copolymers, said polymeric film containing glycerol monostearate and a plasticizer system consisting of a mixture of at least about 25 parts per hundred parts polymer of a plasticizer incompatible with the glycerol monostearate and a compatible plasticizer, the ratio of incompatible plasticizer to compatible plasticizer being at least about 2.5 to 1.

3. The film of claim 2, wherein said incompatible plasticizer is a member selected from the group consisting of di-n-butyl-sebacate and di-2-ethyl-hexyl-adipate.

4. The film of claim 2, wherein said compatible plasticizer is an epoxidized fatty triglyceride.

5. The film of claim 2, wherein said incompatible plasticizer is present in an amount no greater than 35 parts.

6. The film of claim 2, wherein said incompatible and compatible plasticizer mixture is present in an amount from 35 to 50 parts.

7. The film of claim 2, wherein said glycerol monostearate is present in an amount from 0.1 to 1 part per hundred parts polymer.

8. The film of claim 7, wherein the polyvinyl chloride is a resin having an intrinsic viscosity of at least 0.80 deciliters per gram.

9. The film of claim 7, wherein said glycerol monostearate is present in an amount from about 0.1 to 0.3 parts per hundred parts polymer.

10. The film of claim 2, wherein said incompatible plasticizer is a member selected from the group consisting of di-n-butyl-sebacate and di-2-ethyl-hexyl-adipate and the compatible plasticizer is an epoxidized fatty triglyceride.

11. The film of claim 2, wherein said incompatible and compatible plasticizer mixture is present in an amount from 35 to 50 parts, and wherein said glycerol monostearate is present in an amount from 0.1 to 1 part per hundred parts polymer.

12. The film of claim 2, wherein said incompatible plasticizer is a member selected from the group consisting of di-n-butyl-sebacate and di-2-ethyl-hexyl-adipate and the compatible plasticizer is an epoxidized fatty triglyceride and wherein said glycerol monostearate is present in an amount from 0.1 to 1 part per hundred parts polymer.

13. The film of claim 2, wherein said incompatible plasticizer is a member selected from the group consisting of di-n-butyl-sebacate and di-2-ethyl-hexyl-adipate and the compatible plasticizer is an epoxidized fatty triglyceride, and wherein said incompatible and compatible plasticizer mixture is present in an amount from 35 to 50 parts, and wherein said glycerol monosterate is present in an amount from 0.1 to 1 part per hundred parts polymer.

14. The film of claim 2, wherein said incompatible plasticizer is a member selected from the group consisting of di-n-butyl sebacate and di-2-ethyl-hexyl-adipate and the compatible plasticizer is an epoxidized fatty triglyceride, and wherein said incompatible and compatible plasticizer mixture is present in an amount from 35 to 50 parts, and wherein said glycerol monostearate is present in an amount from 0.1 to 0.3 parts per hundred parts polymer.

References Cited

UNITED STATES PATENTS

| 2,464,855 | 3/1949 | Duggan et al. | 260—32.6 |
| 2,676,943 | 4/1954 | Carson | 260—31.8 |
| 3,048,263 | 8/1962 | Sacks et al. | 206—45.33 |
| 3,048,266 | 8/1962 | Hackhel et al. | 206—45.34 |
| 3,057,831 | 10/1962 | Holdsworth | 260—78.5 |
| 3,326,831 | 6/1967 | Avtges | 260—28.5 |

OTHER REFERENCES

Becher, "Emulsions: Theory and Practice," 1957, p. 180, TP156E6B4E.

DONALD E. CZAJA, *Primary Examiner.*

R. A. WHITE, *Assistant Examiner.*

U.S. Cl. X.R.

260—31.8, 41; 99—171; 264—95